US008106755B1

(12) United States Patent
Knox

(10) Patent No.: US 8,106,755 B1
(45) Date of Patent: Jan. 31, 2012

(54) TRIPLE-FUNCTION VEHICLE SAFETY SENSOR SYSTEM

(75) Inventor: Robert M. Knox, Geneva, IL (US)

(73) Assignee: Epsilon Lambda Electronics Corp., West Chicago, IL (US)

( * ) Notice: Subject to any disclaimer, the term of this patent is extended or adjusted under 35 U.S.C. 154(b) by 460 days.

(21) Appl. No.: 12/069,927

(22) Filed: Feb. 14, 2008

(51) Int. Cl.
*B60Q 1/00* (2006.01)
(52) U.S. Cl. .......... 340/439; 340/436; 340/435
(58) Field of Classification Search .......... 340/439, 340/435, 436, 903; 342/27; 180/271; 701/301
See application file for complete search history.

(56) References Cited

U.S. PATENT DOCUMENTS

| | | | | |
|---|---|---|---|---|
| 5,235,316 A | * | 8/1993 | Qualizza | 340/436 |
| 5,315,303 A | * | 5/1994 | Tsou et al. | 342/27 |
| 7,038,577 B2 | * | 5/2006 | Pawlicki et al. | 340/435 |
| 7,176,830 B2 | * | 2/2007 | Horibe | 701/301 |
| 7,583,182 B2 | * | 9/2009 | Wang et al. | 340/436 |

* cited by examiner

*Primary Examiner* — John A Tweel, Jr.

(57) ABSTRACT

A vehicle safety sensor system (VSSS) includes driver-side and passenger-side sensor means. The VSSS implements multiple safety functions as forward collision warning (or avoidance) and side/rear object detection. Subsystems of both sensor means are placed in the location normally occupied by side-view mirrors providing the driver an unobstructed view of both sensor means. The VSSS includes: (1) driver-side and passenger-side three-dimensional forward radar sensor; driver-side and passenger-side forward two dimensional video sensor; (2) driver-side and passenger-side side/rear two-dimensional radar sensor; driver-side and passenger-side side/rear two-dimensional video sensor; (3) data processor combining four outputs from the radar sensor and video sensor on driver-side and the passenger-side using data fusion for forward hazardous obstacle detection and validation; data processor also combining two outputs from the radar sensor and video sensor on driver side and passenger side using data fusion for side/rear hazardous obstacle detection and validation on respective sides of the vehicle.

8 Claims, 6 Drawing Sheets

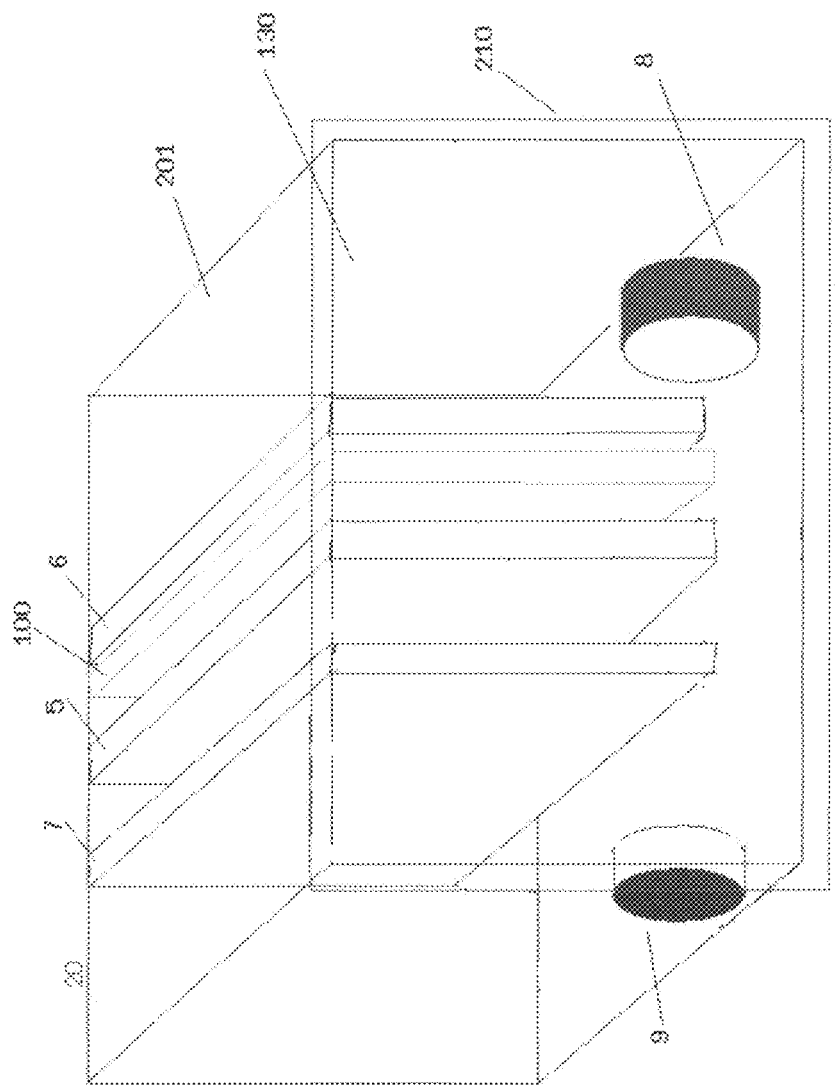

TRIPLE-FUNCTION VEHICLE SAFETY SENSOR SYSTEM

BACKGROUND OF THE INVENTION

1. Field of the Invention

This invention relates to detection of objects ahead of a highway vehicle, detection of objects in lanes adjacent to and immediately behind the vehicle, and to detection of boundaries of the lane occupied by the vehicle.

2. Prior Art

Heretofore currently available commercial vehicles sensor systems typically performed only a single function. On the other hand, radar object sensors capable of three dimensional (range, azimuth, and elevation) multiple object detection have been available for some time for military applications. Additionally, forward looking radar sensors have been deployed for automotive applications, primarily for adaptive cruise control systems. These systems are typically capable only of two dimensional (range and azimuth) detection. Two dimensional sensors are not adequately reliable for long distance determination of a hazard. Without elevation information of an object far ahead, it is difficult to reliably determine whether it is a harmless overhead object (bridge or sign) or a hazard (disabled vehicle in the same lane). Therefore, no reliable forward looking collision warning sensor system has been commercialized for use by the general public.

The current art of automotive forward looking sensors is based on a single sensor mounted at the front center of the vehicle. Because the beam angle is relatively narrow (typically 3-10 degrees) there are azimuth blind zones at short range forward of the vehicle on the left and right side of the beam. These blind zones prevent detection of vehicles that cut in close to the host vehicle (5-50 meters) or any obstacle that may present an immediate threat of collision.

Radar distance/velocity detectors for vehicular application are disclosed in U.S. Pat. Nos. 5,677,695; 5,839,534; 5,436,835; 5,341,144. These patents give considerable detail regarding object range measurement but no consideration to object location in either azimuth angle or elevation angle.

An automotive vehicle tracking radar is described in U.S. Reissue Pat. No. RE 36,819 in which a two-lobe monopulse antenna is used for determining angle of multiple targets in the antenna field-of-view.

Another vehicle collision avoidance system is described in U.S. Pat. No. 5,091,726. This system includes forward and rearward beams that provide range and velocity information. This system does include means for tracking vehicles in azimuth or elevation angle direction.

Various inventors have described means for achieving one-dimensional beam scanning of an antenna that is fixed. For example, U.S. Pat. No. 5,752,596 sets out an application of beam scanning for automotive forward looking radar in the azimuth plane. No means for scanning in the elevation plane is described.

A system that includes a safe stopping distance detector and related antenna for vehicles is described in U.S. Pat. No. 5,278,692. This system employs a patch array antenna to cover a field-of-view ahead of a vehicle. While consideration is given to separating the patch array into two sections for detection of the object azimuth angle, no mention of elevation angle detection is given.

Lastly, a vehicle detection and collision avoidance apparatus described in U.S. Pat. No. 4,626,850 uses an acoustic transducer (for obstacle ranging) and describes mechanically scanning of the acoustic transducer to obtain azimuth angle information. Again, there is no consideration for detecting the elevation angle of the obstacle.

SUMMARY OF THE INVENTION

The vehicle safety sensor system (VSSS) of this invention includes a three-dimensional (3D) radar object tracking system for vehicular forward object detection. This forward object tracking system is enhanced by additional video object identification and validation (visibility permitting). These improvements then are further enhanced by use of redundant 3D forward sensors, one on the driver-side and one on the passenger-side of the vehicle. The use of two forward sensors, one on each side, broadens the field-of-view at short range improving the detection, for example of vehicles that cut-in close to the host vehicle. At a longer distance, where the antenna patterns of the two forward radar/video sensors share a common field-of-view, the outputs of the two [VSS] sensors are compared by a [VSSS] system processor to provide redundant detection of objects. This feature thereby increases the likelihood of detecting potential hazards and decreases the likelihood of falsely reporting objects that are not a hazard. Independent video sensors are provided on each side of the vehicle using both side/rear looking and downward looking video cameras for providing side/rear and downward looking views. These side/rear views on both sides of the vehicle are used for object validation when combined with output of side/rear radar sensors. The downward views are used, together with the forward video camera views on both sides of the vehicle for detection of lane markers as part of the lane departure detection means.

These innovations and enhancements for the three sensor functions can be achieved at affordable cost, compared to the use of separate sensors, because the total number of sensor units is reduced to only two and, thereby, the cost of installation on the vehicle is correspondingly reduced. Further, potential installation cost reduction may be provided by the use of wireless connectivity (such as blue tooth wireless) among the driver-side VSS sensor unit, the passenger-side VSS sensor unit and the driver control module. The VSSS system processor can be co-located at, or combined with, the driver VSS side or passenger-side processor. Use of wireless connectivity simplifies wiring and reduces cost by merely requiring 12 Volt DC supplied to the three parts of the system.

Functional enhancements of this invention add little to the cost of this triple-function VSSS system while improving the accuracy and reliability of object detection compared, for example, with the two-dimensional intelligent cruise control (ICC) sensor systems currently available. Means for achieving low cost three-dimensional forward object tracking are included within the scope of this invention. Other means for achieving two functions, forward object detection and side object detection are also included within the scope of this invention. Other means for achieving three functions, forward object detection, side/rear object detection and lane departure sensing are included within the scope of this invention.

DESCRIPTION OF THE DRAWING FIGURES

Figure 1:
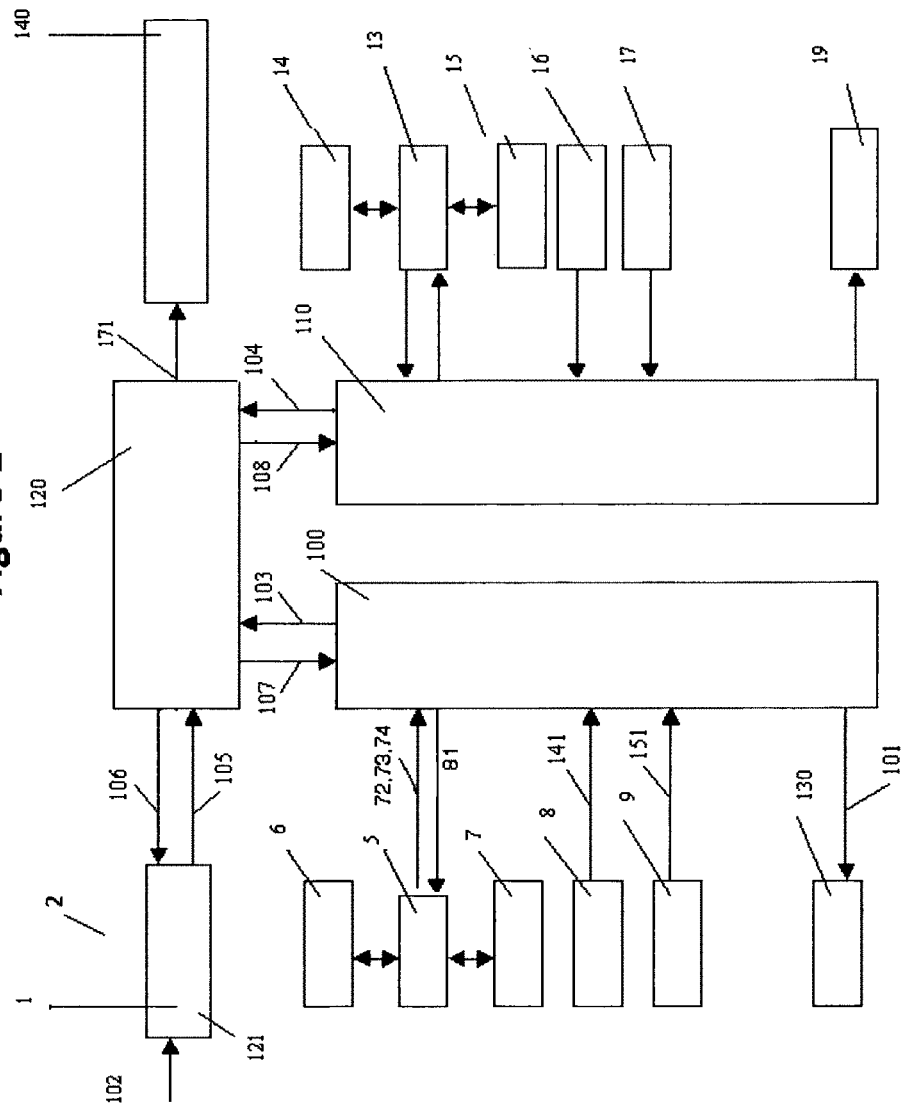
FIG. 1 is a block diagram of a triple-function vehicle safety sensor system of this invention.

FIG. 6 is perspective view of a triple-function safety sensor unit (20). This unit (20) replaces, for example, the driver's side side-view mirror. A like unit (21) replaces the passenger-side side-view mirror.

DESCRIPTION OF PREFERRED EMBODIMENT

A block diagram of a triple function vehicle safety sensor system of this invention is shown generally in FIGS. 1-5 and designated (2). Elements of the system (2) include the following: a driver control module (1); a system processor (120); a driver-side processor (100); a driver-side radar transmitter/receiver assembly (5); a driver-side forward object detection radar antenna assembly (6); a driver-side side/rear object detection radar antenna assembly (7); a driver-side forward object detection video camera (8); a driver-side side/rear object detection video camera (9); a driver-side lane departure video camera (10); a driver-side object video display screen (130), a passenger-side processor (110); a passenger-side radar transmitter/receiver assembly (13); a passenger-side forward object detection radar antenna assembly (14); a passenger-side side/rear object detection radar antenna assembly (15); a passenger-side forward object detection video camera (16); a passenger-side side/rear object detection video camera (17); a passenger-side lane departure video camera (18); a passenger-side object video display screen (19) of a passenger-side safety sensor unit (21). The driver control module (1) can be mounted within the vehicle [cabin] on the driver's armrest or dashboard. Elements (5-10), (100), (120), and (130) can be contained in a single safety sensor unit (20) mounted exterior to the vehicle on the driver-side in the location normally occupied by a side-view mirror. Elements (13-19) and (110) can be mounted in a single safety sensor unit (21) mounted exterior to the vehicle on the passenger-side in the location normally occupied by a side-view mirror.

Figure 2:
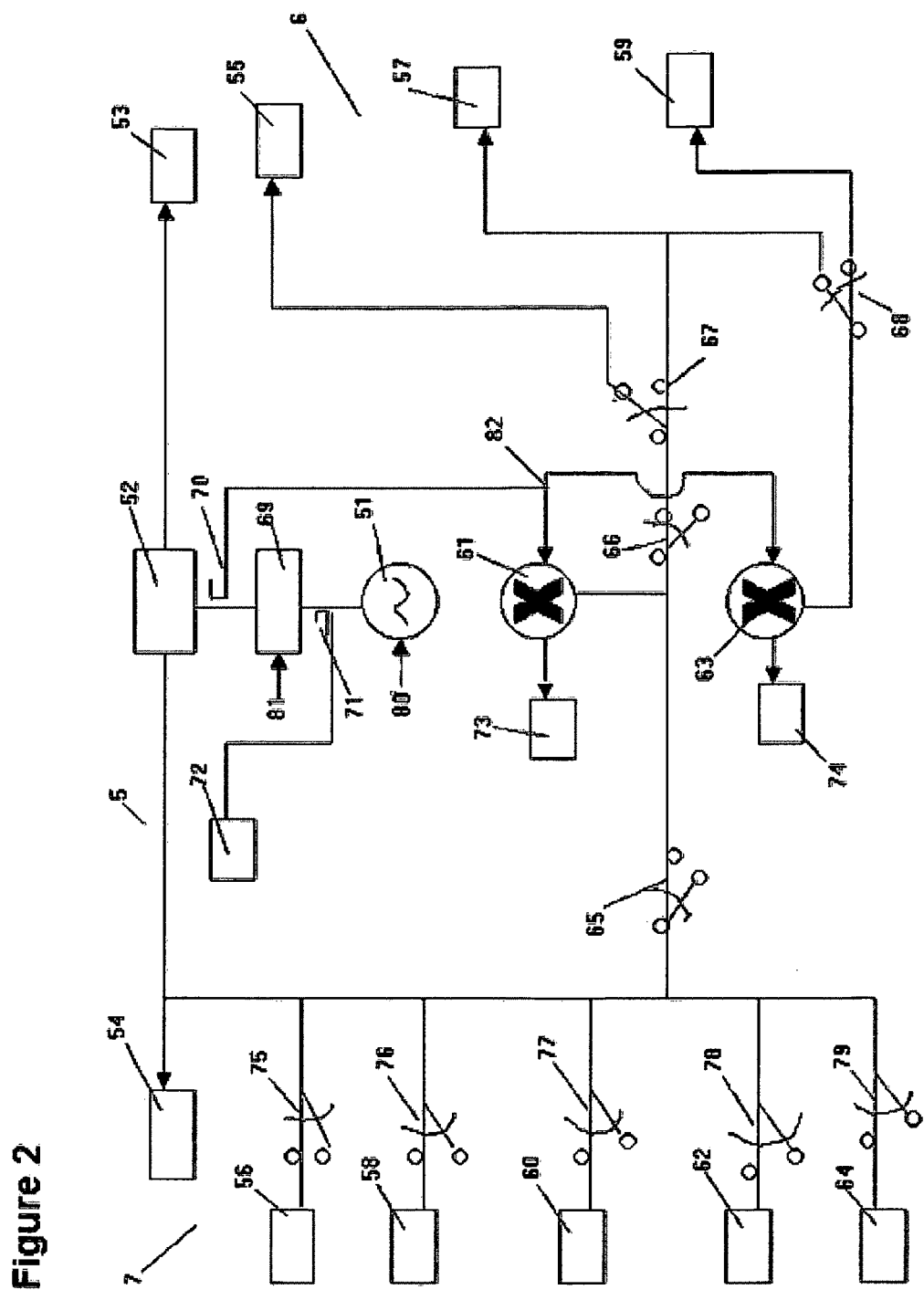
FIG. 2 is a block diagram of the radar transmitter/receiver assembly (5) for the driver-side sensor means set out in FIG. 1.

A block diagram of the radar antenna/transmitter/receiver assembly (5) for the driver-side sensor means (30) is shown in FIG. 2. The same configuration is applicable to the passenger-side antenna/transmitter/receiver assembly (13). All descriptions given are based on use of microwave or millimeter wave radar (about 5 to 300 GHz) but are specifically illustrated by operation in the band from 76.0 to 77.0 GHz because of the compact size of the forward receiver antennas (55, 57, and 59) and side/rear receiver antennas (56, 58, 60, 62, and 64) and the potentially lower cost of components for this FCC authorized (unlicensed in the USA) band than other FCC authorized bands, because of use for automotive radar applications. Noteworthy of this embodiment is the fact that a single transmitter oscillator (51) and modulator (69) serve the needs of both the forward and side/rear radar obstacle detection function by using a transmitter switch (52) for alternating the connection to the driver-side forward object detection radar antenna assembly (6) and the driver-side side/rear object detection radar antenna assembly (7). The radar transmitter output of the driver-side sensor means (30) or a passenger-side sensor means (31) operate in the forward field-of-view when the transmitter switch (52) is closed to the forward transmitter antenna (53), a forward receiver mixer switch (66) is closed and a side/rear receiver mixer switch (65) is open. The radar transmitter output of the driver-side sensor means (30) and the passenger-side sensor means (31) operate in a side/rear field-of-view when the transmitter switch (52) is closed to the side/rear transmitter antenna (54), the side/rear receiver mixer switch (65) is closed and the forward receiver mixer switch (66) is open. The operation of the switch (52) between the two fields-of-view is very rapid such that data is collected virtually simultaneously and continuously and in real time so that detected object presence and location is available for threat assessment to the vehicle in the front and both side/rear fields-of-view.

Figure 3:
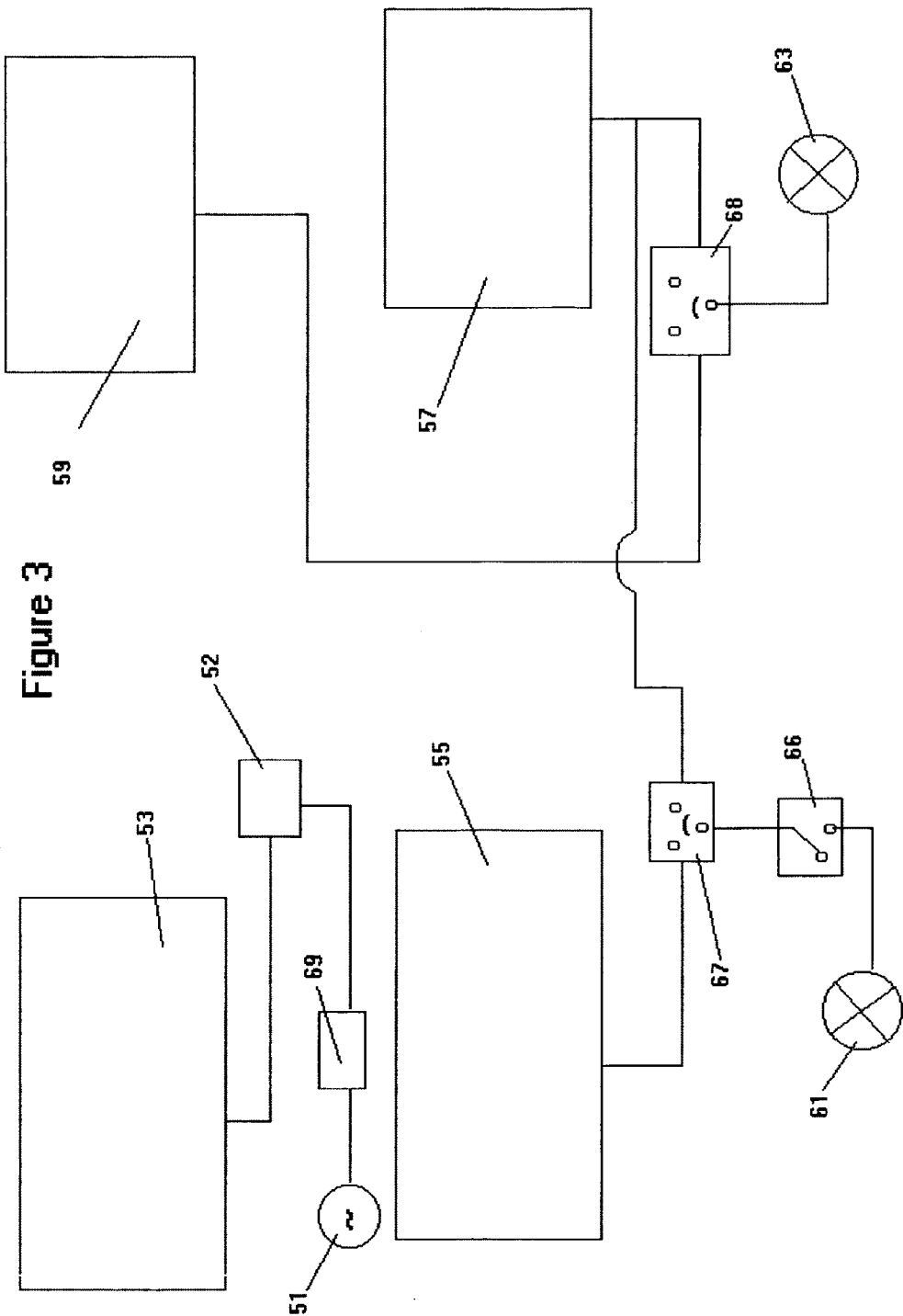
FIG. 3 is a block diagram of the forward radar antenna assembly (6) shown in FIG. 1.

The driver-side forward object detection radar antenna assembly (6) includes, for example, three patch-array receiver antennas (55, 57, 59) that are connected to dual mixers (61, 63) using the receiver antenna switches (67,68) and the receiver mixer switch (66) to facilitate the monopulse phase measurement method for azimuth and elevation target location in the processor (100) of the driver-side sensor means (30). This forward object detection radar antenna assembly (6) has four independent patch array antennas (53, 55, 57, 59) as shown in FIGS. 2 and 3. The forward transmitter antenna (53) projects the transmitter energy to a forward field-of-view. The three forward receiver antennas (55, 57, 59) are positioned to alternatively, in time sequence, provide one pair of antennas (55,57) for azimuth and a second pair (57,59) for elevation by operation of the receiver switches (67) and (68) with receiver switch (66) closed. Forward receiver antennas (55, 57) are used for the azimuth angle determination and receiver antennas (57, 59) are used for the elevation angle determination. The receiver mixer switches (67, 68) are used to sequentially select a pair of patch array receiver antenna (57, 59) for the elevation monopulse measurement and alternatively select a pair of patch array receiver antenna (55, 57) for the azimuth monopulse measurement for each object in the forward field-of-view.

Referring to FIG. 2, the energy of the transmitter/oscillator (51) is sampled by a first directional coupler (70) and fed to the azimuth and elevation receiver mixers (61, 63) via a power splitter (82) to facilitate generation of intermediate frequency (IF) outputs (73, 74) representing the range to an object in the forward field-of-view and containing the phase information to determine the angle of the object from bore sight of the receiver antennas (55, 57, 59). The IF outputs (73, 74) of the two mixers (61, 63) in the transmitter/receiver assembly (5) are fed to the drivers side processor (100) as shown in FIG. 1, where phase comparison of the two IF outputs (73, 74) is made to determine the object azimuth and elevation angles relative to the bore sight angle of the receiver antenna array (55, 57, 59).

As seen in FIG. 2, the radar transmitter/oscillator (51) and modulator (69), used alternatively for forward object detection and side/rear object detection, are connected by means of a transmitter switch (52) to the forward object detection transmitter antenna (53) and the side/rear object detection transmitter antenna (54). The field-of-view for side/rear object detection is an elevation angle Φ degrees and azimuth angle Θ degrees. The driver-side side/rear object detection radar antenna assembly (7) for side/rear object detection has one transmitter antenna (54). This transmitter antenna (54), which covers the entire side/rear field-of-view, is connected to the transmitter/oscillator (51) via transmitter switch (52). Additionally, the side/rear object radar antenna assembly (7) includes N (five shown in FIG. 2) receiver antennas (56, 58, 60, 62, 64) connected sequentially by N switches (five switches (75, 76, 77, 78, 79) shown in FIG. 2) to the mixer (61) while the side/rear receiver switch (65) is closed and forward receiver switch (66) is open. The side/rear receiver antennas (56, 58, 60, 62, 64) have narrower beams and each is directed (squinted) at a different angle with respect to the bore sight angle of the transmitter antenna (54). The mixer IF output (73) provides an input to the driver-side processor (100) to determine range to multiple objects in the field-of-view of respective side/rear receiver antennas (56, 58, 60, 62, 64). Each of the respective side/rear receiver antennas (56, 58, 60, 62, 64) has a beam width in azimuth of (100/N) % (20% for five receiver antennas) of that of the side/rear transmitter antenna (54) and are respectively squinted at increasing azimuth angles relative to the bore sight direction of the side/rear transmitter antenna (54) so that the object detected is localized within the field-of-view to the azimuth angle covered by each of the respective side/rear receiver antennas (56, 58, 60, 62, 64). For example, a first antenna having an azimuth angle width of $\Theta/N$ degrees is squinted with respect to the boresight direction at an angle $\Theta/2N$ degrees. A second antenna is squinted at an angle of $3\Theta/2N$ degrees. All of the side/rear receiver antennas (56, 58, 60, 62, 64) have identical elevation angle of $\Phi$ degrees.

The azimuth angle coverage of the side/rear field-of-view can be illustrated by designating the side/rear transmitter antenna (54) to cover a field-of-view, for example, $\Theta=60$ degrees outward from a line parallel to the direction of travel of the vehicle. The first side/rear receiver antenna (for N=5) can be designated to cover an azimuth field of view of 12 degrees squinted at an angle of 6 degrees from the same line. The second receiver antenna has identical beam width but squinted at an angle of 18 degrees from the same line. The three remaining identical receive antennas are squinted respectively at azimuth angles of 30, 42 and 54 degrees from the same line. For differing total angular fields-of-view alternative numbers of antennas with alternative angles can be used to accomplish the required coverage. Squinting of the patch array antenna beam angle can be accomplished by controlled physical placement of individual antennas or by placing the receiver antennas (56, 58, 60, 62, 64) in the same plane but adjusting the transmission line lengths (phase shift) within the feed network of the individual patch arrays.

As seen in FIG. 2, a second directional coupler (71) is used to sample a small amount of the un-modulated transmitter/oscillator (51) energy output (72). This energy output (72) is fed back via a terminal to the driver-side processor (100), see FIG. 1. This invention encompasses any form of radar modulation (amplitude, frequency or phase) to enable the measurement of range. This energy output (72) enables the processor (100) to provide a control signal output (81) back to the modulator (69) of the transmitter/receiver assembly (5). If the transmitter oscillator modulation is FM-CW type such that ranging is accomplished by a linearized sweep of frequency, then the processor (100) provides a signal (81) to the modulator (69) to assure a highly linear sweep of frequency in time. If the transmitter oscillator ranging is by pulse time delay, the processor (100) provides control of the pulse modulator (69) and uses the sampled transmitter feedback for measurement of time delay of return pulses in the IF outputs (73, 74) of the mixers (61, 63) respectively. If the radar ranging uses frequency shift keying (FSK) modulation, the processor (100) controls the frequency shift in the modulator (69) and samples the transmitter signal (58) for accurate calibration of the range measurement. In each method of modulation for range determination, the processor (100) provides the required control signal (81) back to the transmitter/receiver assembly (5) of the driver-side sensor means (30).

Figure 4:
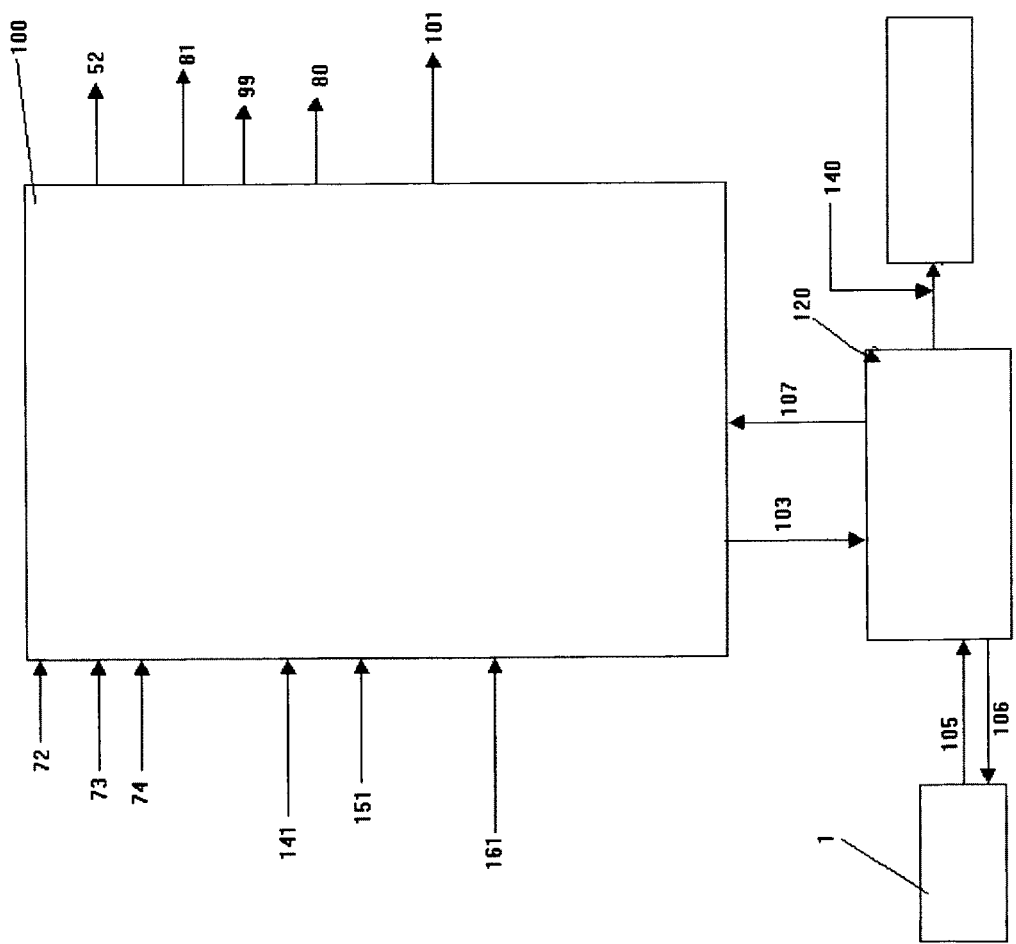
FIG. 4 is a block diagrams showing the inputs and outputs of the driver-side sensor means processor (100) seen in FIG. 1.

Block diagrams showing the inputs and outputs of the driver-side processor (100) are shown in FIGS. 1 and 4. It should be noted that the passenger-side processor (110) is identical to the driver-side processor (100). Inputs to the driver-side processor (100) include the sampled signal (72) from the transmitter/oscillator (51), output (73) from the azimuth mixer (61), output (74) from the elevation mixer (63), output (141) from the driver-side forward object detection video camera (8), output (151) from the driver-side side/rear object detection video camera (9), output (161) from the driver-side lane departure video camera (10), and an output (107) from the system signal processor (120) to the driver-side processor (100).

As seen in FIGS. 1, 2 and 4, outputs of the driver-side processor (100) to the sensor means transmitter/receiver assembly (5) include the following: an output control signal (99) for the transmitter switch (52), and the control voltage (81) to the modular (69). Other outputs of the driver-side processor (100) include the display signal (101) to the object video display screen (130) of the driver-side sensor unit (20), the object listing classification serial data (103) to the system processor (120). The processor (100), using the input (161) from the lane departure video camera (10) determines if the vehicle is adequately centered within its lane on the driver-side and generates an output (101) to the sensor unit side/rear object video display screen (130). If the vehicle is not centered within preset limits, a suitable alert (such as an icon or symbol) is presented on the driver-side video display screen (130). This alert is also reported to the system processor (120) via output (103) from the processor (100) for possible alert to the driver control module (1) via output (106) using a flashing light or audible warning. The passenger-side processor (110) for the passenger-side sensor means (31) is identical to that for the driver-side and has a serial data output (104) that is a second input to the system processor (120) for object detection validation by comparison between the object detection of the driver-side sensor means (30) and the object detection of the passenger-side sensor means (31) where the fields-of-view overlap for the two processors (100, 110).

The output (103) from the driver-side processor (100) and the output (104) from the passenger-side processor (110) couple to the system processor (120). The system processor (120) compares the independently detected object classifications of the two sensor means processors (100, 110) to validate or reject objects separately detected by the individual sensor means processors (100, 110). The redundant data fusion feature of this inventive vehicle safety sensor system (2) reduces the possibility of reporting in an output (171) from the system processor (120) an object that is not in the field-of-view or failing to report an object that is in the field-of-view. Other inputs to the system processor (120) include commands (105) from the driver control module (1) regarding operation of the system and its displays. These driver commands (105) are further processed by the system processor (120) and then relayed via output (107) to the driver-side processor (100) and output (108) to the passenger-side processor (110). If an emergency alert to the driver via an audible or visual signal is determined appropriate by the system processor (120), this alert is conveyed to the driver control module (1) via output (106) from the system processor (120).

The primary output of the system processor (120) is the validated object listing classification (171) for objects detected in the driver-side and passenger-side forward field-of-view and the driver-side and passenger-side side/rear field-of-view. These outputs (171) are supplied to a vehicle threat assessment computer (140) located outside of the inventive system (2). The serial data listing output (171) for the driver-side and passenger-side forward field-of-view includes object range, azimuth angle, elevation angle, radar cross section and relative velocity for all detected and validated objects (validated by processors (100, 110)). The serial data listing output (171) for the driver-side and passenger-side side/rear fieldsof-view includes range, azimuth angle, radar cross section and relative velocity of all validated objects.

Figure 5:
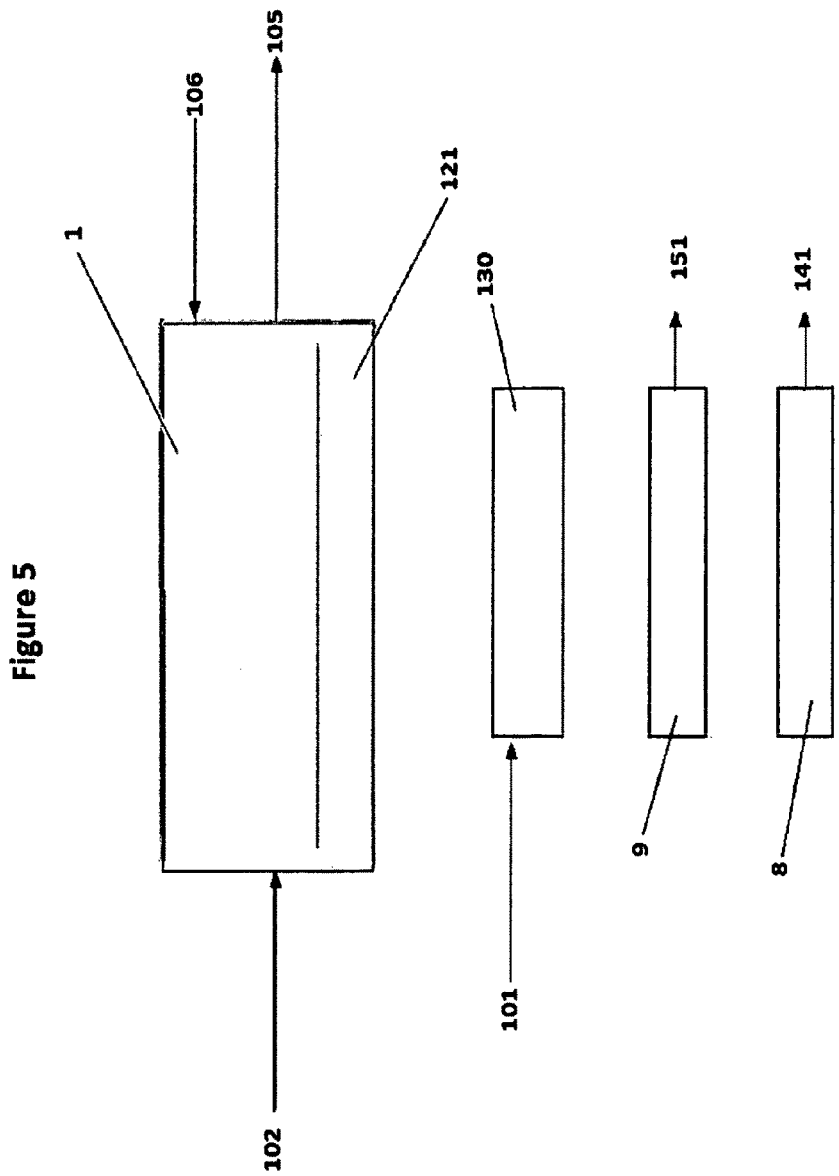
FIG. 5 is a block diagram showing inputs and/or outputs of the driver control module and other functional parts of the system.

The vehicle safety sensor system (2) includes additional elements. FIG. 5 sets out such elements for the driver-side sensor means (30) of the system (2) that, as noted above, are identical to the passenger-side sensor means (31) of the system (2). The system (2) includes a driver control module (1) having selectable operation and control function inputs (102) from the driver, an audible alarm (121) and an output (105) from the control module (1) to the system processor (120). The remaining elements (8, 9, 10, 130) in FIG. 5 are part of the driver-side safety sensor unit (20). The passenger-side safety sensor unit (21) has these same elements. These elements include: a driver-side object video display screen (130) viewable by the driver and having input (101) from the driver-side processor (100); a driver-side forward object detection video camera (8) for forward lane marker detection and for validation (in clear visibility) of objects detected and classified ahead of the vehicle by the forward radar transmitter/receiver assembly (5); the forward object detection video camera (8) has an output (141) to the processor (100); a side/rear object detection video camera (9) having an output (151) to the processor (100) for viewing in the driver-side side/rear object video display screen (130) a video image of the side/rear field-of-view and for validation of objects detected and classified by the side/rear radar transmitter/receiver assembly (5); and a downward facing video camera (10) for lane departure detection having output (161) to the processor (100).

The scene displayed on the driver-side side object video display screen (130) of the safety sensor unit (20) is the side/rear field-of-view generated by the driver-side side/rear object detection video camera (9). The driver observes the scene normally seen in the driver-side vehicle side-view mirror. This screen (130) requires no mechanical adjustment, as does a side-view mirror, because the same view is seen from any driver position (within normal limits of seat position and driver height).

As noted above, the output (141) from the forward object detection video camera (8) is transmitted to the processor (100). The processor (100) contains algorithms to validate the existence and identification of objects in the field-of-view. These objects are initially located and classified by the forward radar transmitter/receiver assembly (5) operating with its processor (100) and the system processor (120). Location of the position of an object initially located by the forward radar allows the processor (100) to examine that small region of the forward field-of-view in detail using the output (141) from the forward object detection video camera (8) for more detailed object identification and classification through radar and video data fusion and image formation algorithms. This feature, to accomplish radar and video data fusion, allows the individual sensor means (30, 31) and driver-side and passenger-side processors (100, 110) to separately validate and report to the system processor (120) objects in the forward field-of-view and not report objects that are erroneously detected but not validated to be in the field-of-view. Erroneous object detection can occur for brief periods of time due to multipath scattering of the radar backscatter from an object. Examples of such scattering are from the roadway surface or a guard rail at the side of the roadway. The output (141) of the forward object detection video camera (8) is also used to determine lane boundary markings ahead of the vehicle to assist with determination of roadway curvature and with determination of vehicle lane departure.

The output (161) from the downward facing lane departure video camera (10) on the driver-side to the processor (100) is used to determine the lateral position of the vehicle relative to lane marker stripes on the roadway. The lane marker position determined from the forward object detection video camera (8) is also used by the processor (100) to anticipate vehicle movement within the lane for possible lane departure warning to the driver (for example, when the roadway curves ahead). This position information is part of the serial data output (103) from the driver-side processor (100) to the system processor (120) and the serial data output (104) from the passenger-side processor (110) to the system processor (120) as determined from the lane departure video camera (18) on the passenger-side. Algorithms in the system processor (120) determine when the vehicle is in danger of lane or roadway departure on the driver-side for the purpose of providing a visual alert via output (107) from the system processor (120) to the processor (100) on the driver-side. The processor (100) in turn generates an output (101). This output (101) is forwarded to the driver-side side object video display screen (130) to display a message or symbol and/or to the system processor (120) that generates an output (106) that is transmitted to the driver control module (1) to activate the audible alarm (121). A similar process relays warning of lane departure on the passenger-side in the passenger-side object video display screen (19) and/or activation of the audible alarm (121).

As seen in FIG. 1, separate object detection outputs (103, 104) from the respective driver-side and passenger-side processors (100, 110) are provided to the system processor (120). This system processor (120) compares the parameters of objects separately determined by the driver-side processor (100) and passenger-side processor (110) in the field-of-view common to the two sensor means processors (100, 110) ahead of the vehicle. Algorithms in the system processor (120) are used to reject questionable object detection (possibly caused by multipath or sidelobes of antennas) and to confirm objects reliably detected by both processors (100, 110). Objects confirmed by this process are then compared with objects detected by the forward object detection video cameras (8, 16) (when visibility in the field-of-view is clear) for additional validation by the system processor (120).

A possible configuration of the triple-function safety sensor unit (20) configured for mounting on the driver-side in the place where a side-view mirror is typically placed, is shown in FIG. 6. The driver-side safety sensor unit elements (5, 6, 7, 8, 9, 130) are mounted within a housing (201) of the unit (20) with the unit (20) placed at the exterior of the driver's window so that the driver can view the side object video display screen (130). This screen (130) is partially shaded from external light by a shroud (210). Displayed on the video screen (130) is the scene generated by the side/rear object detection video camera (9) plus any symbols or messages for the warning of the driver of hazards. The forward object detection video camera (8) is directed forward to generate scene inputs (141) to the processor (100). Elements of the driver-side sensor unit (20) that are used for both side/rear and forward radar object detection include a transmitter/receiver assembly (5), a driver-side side/rear object detection radar antenna assembly (7), a forward object detection radar antenna assembly (6) and a processor (100). A driver-side lane departure video camera (10) is mounted with a view of the roadway below the sensor housing (201). This video camera (10) generates scene outputs (161) of the pavement boundary markings that are input to the processor (100) as part of the lane departure safety function. The system processor (120) also can be mounted in the driver-side or passenger-side sensor unit housing (201) for ease of interconnection with other parts of the system (2).

While embodiments, uses and advantages of this invention have been shown and discussed, it should be understood that

What I claim is:

1. A method of operating a system for providing safety for a driver of a vehicle using a low cost vehicle safety system, said method comprising the steps of:
   a. said system detecting and redundantly validating by means of multiple sensors including radar, video and multi-mode signal processing, objects and potential hazards ahead of the vehicle using three-dimensional radar and video imaging and providing a report of such hazards for driver response,
   b. said system detecting and redundantly validating, by means of multiple sensors including radar, video, and multi-mode signal processing, objects and potential hazards in lanes of traffic adjacent to said vehicle using two-dimensional radar and video imaging and providing a report of such hazard for driver response, and
   said system for providing safety for said driver of said vehicle comprising driver-side sensor means and passenger-side sensor means including,
      three-dimensional millimeter radar transmitter/receiver subsystem means having object location capability to a range of at least 150 meters forward of said vehicle,
      two-dimensional video subsystem means having object location capability forward of said vehicle to the range of at least 150 meters,
      two-dimensional millimeter wave radar transmitter/receiver system means having object location capability to a range of at least 20 meters to the side/rear of said vehicle,
      two-dimensional video subsystem means having object location capability to the range of at least 20 meters to the side/rear of said vehicle,
      video display screen operatively connected to said driver-side sensor means to present to said driver views of said roadway to the side/rear of the vehicle on driver-side of said vehicle as provided by said driver-side two-dimensional video subsystem, and
      video display screen operatively connected to said passenger-side sensor means to present to said driver views of said roadway to the side/rear of said vehicle on passenger-side of said vehicle as provided by said passenger-side two-dimensional video subsystem.

2. Driver-side sensor means and passenger-side sensor means as described in claim 1 and further characterized by each sensor means including,
   a transmitter/receiver assembly having a transmitter/oscillator to originate an electromagnetic signal of chosen frequency and connected antenna switching for alternating respectively between a forward antenna array and a side/rear antenna array.

3. Driver sensor means and passenger-side sensor means as described in claim 2 and further characterized by said forward antenna array including,
   a transmitter antenna connected to transmitter switching, and
   a set of receivers antennas connected by switching to receiver mixers having means for alternatively and sequentially scanning in both horizontally and vertical planes of said forward field-of-view for generation of IF signals containing azimuth and elevation angle information of objects in said field-of view forward of said driver-side and said passenger-side sensor means to detect and locate said objects in the horizontal and the vertical plane.

4. Driver-side sensor means and passenger-side sensor means as described in claim 2 and further characterized by said side/rear antenna array including,
   a transmitter antenna connected to transmitter switching, and
   a set of antennas connected by switching to said receiver mixers for generation of IF signals containing the azimuth angle information of objects in said side/rear field-of view.

5. Driver-side sensor means and passenger-side sensor means as described in claim 2 and further characterized by said transmitter/receiver assembly including,
   independent mixer channels capable of down-converting to an intermediate frequency the radio frequency of the electromagnetic signal transmitted by said transmitter/oscillator through said forward and said side/rear sets of antennas and backscattered from objects in respective antenna field-of-view of said respective antenna sets.

6. Driver-side sensor means and passenger-side sensor means as described in claim 3 and further characterized by said set of forward antennas including,
   multiple narrow beam patch array antennas arrayed in a single plane including a forward transmitter patch array antenna that radiates a chosen frequency of transmitter oscillator electromagnetic energy received via said transmitter switching to said forward field-of-view of said vehicle and including forward receiver patch array antennas that then receive backscatter electromagnetic energy from obstacles in said field-of-view of said antennas forward of said vehicle, said receiver antennas being connected to switching connected in pairs to independent receiver mixers to allow determination, by a processor using a monopulse method, of the vertical angle position of objects in said forward field-of-view and horizontal angle position of said objects in said forward field-of-view.

7. Driver-side sensor means and passenger-side sensor means as described in claim 4 and further characterized by said set of narrow beam side/rear antennas including,
   multiple narrow beam patch array antennas arrayed in a single plane aligned perpendicular to the axis of motion of the vehicle and including said transmitter antenna having a horizontal beam covering a desired side and rear field-of-view (for example a horizontal angle of 0 degrees) connected by transmitter switching to said transmitter/oscillator and N multiple receiver antennas each having an azimuth angle of 0/N degrees connected by side/rear receiver antenna switching to said receiver antennas, and being squinted from the boresight direction by N successive azimuth angles such that the total of approximately 0 degrees is encompassed by said N receiver antennas.

8. A system for providing safety for a driver of a vehicle as described in claim 1 and further characterized by,
   a processor capable of modulating a transmitter/oscillator, determining location information with respect to the range of multiple objects in a forward field-of-view, determining location information with respect to the elevation angle of multiple objects in said forward field-of-view using a monopulse phase comparison of two receiver channels, determining location information with respect to the azimuth angle of said multiple objects in said forward field-of-view using said monopulse phase comparison of said receiver channels, determining location determination with respect to the amplitude of return backscatter from each said object in said forward field-of-view, determining information with respect to the relative velocity of each said object in said forward field-of-view by the Doppler frequency shift of said return backscatter, determining from said information on each said object whether said object in said forward field-of-view is one of interest for subsequent reporting as a driver warning, determining location information with respect to the range of multiple objects in the side/rear field-of-view, determining location information with respect to the azimuth angle of said objects in said side/rear field-of-view, determining location information with respect to the amplitude of backscatter from each said object in said side/rear field-of-view, determining information with respect to the relative velocity of each said object in said side/rear field-of-view by Doppler frequency shift of said return backscatter, and determining from said information on each said object whether said object in said side/rear field-of-view is one of interest for subsequent reporting as a driver warning.

* * * * *